Nov. 11, 1969 A. LICHOWSKY 3,478,339

DATA STORAGE APPARATUS INCLUDING LAMINATED ANNULI
TRANSDUCER SUPPORTS CONCENTRIC WITH
THE DATA STORAGE MEANS

Filed Nov. 12, 1965

Inventor:
ABRAHAM LICHOWSKY

By John T. O'Halloran

Attorney 3,478,339
Patented Nov. 11, 1969

1

3,478,339
DATA STORAGE APPARATUS INCLUDING LAMINATED ANNULI TRANSDUCER SUPPORTS CONCENTRIC WITH THE DATA STORAGE MEANS

Abraham Lichowsky, Los Angeles, Calif., assignor to RCA Corporation, a corporation of Delaware Filed Nov. 12, 1965, Ser. No. 507,351
Int. Cl. G11b *5/00*
U.S. Cl. 340—174.1 11 Claims

ABSTRACT OF THE DISCLOSURE

Data storage apparatus includes a plurality of laminations with each formed in the shape of an annulus. A horseshoe shaped transducer is formed on each lamination and the laminations are joined together to form a unitary member. A data storage device having polarizable material thereon is juxtaposed concentric with the unitary member so that the transducers on the unitary member cooperate with the polarizable material contained on the data storage device.

Figures 1, 2:
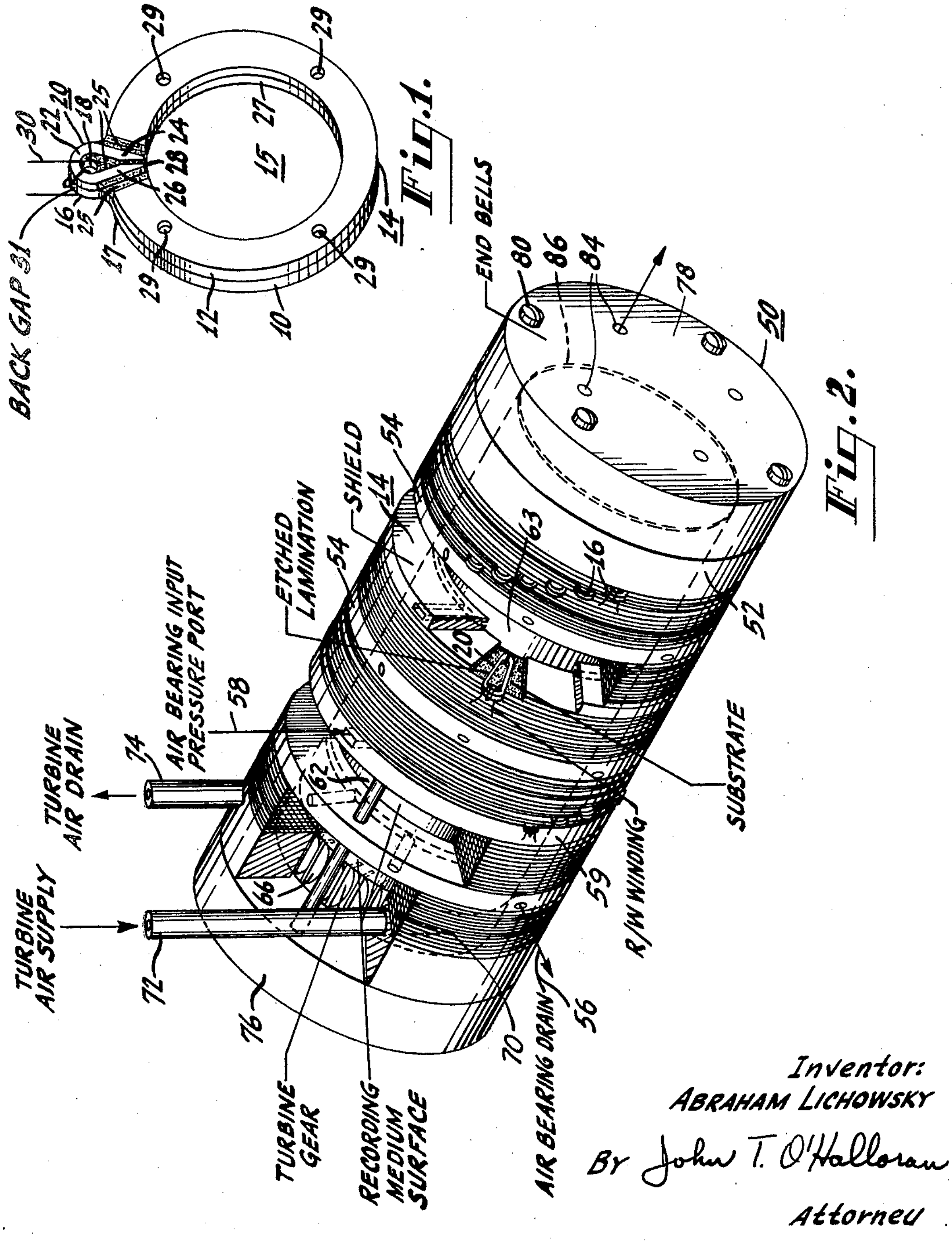

Data storage apparatus having a movable member and a stationary member, such as drum or disc type memories, have a large storage capacity if they are made physically large or if the information data is packed densely thereon. The larger such apparatus is made, the longer it takes to reach the stored data. To decrease this access time, the drum or movable member must be rotated at extremely high speeds. However, to obtain such high speeds, the drum must be made correspondingly smaller and therefore less data is stored. If attempts are made to pack densely on such smaller sized drums, then the transducing heads that read and write on the drum must be made correspondingly small and spaced close to the surface of the drum. However, the relatively large size of prior art transducers establishes a limit on the number of tracks and hence the amount of data that can be recorded on a small drum. Furthermore, to maintain accurate track alignment, such transducers require a complex and expensive suspension system. Consequently, prior art storage apparatus of the drum or disc types do not simultaneously exhibit high data storage capabilities, fast access time, and simple, inexpensive construction.

Accordingly, it is an object of this invention to provide new and improved storage apparatus.

It is another object of this invention to provide a memory having a movable member that exhibits large storage capabilities and also exhibits low access time.

It is another object of this invention to provide a transducer head assembly that permits packing information data on a storage device as densely as desirable, commensurate with the ability of the storage device to record the data.

It is another object of this invention to provide data storage apparatus of a simple and inexpensive construction.

Data storage apparatus embodying the invention include a plurality of laminations, each shaped like an annulus. A transducer is formed on each lamination and the laminations are joined together to form a unitary member having a central aperture. A data storage device having polarizable material formed on the surface thereof is juxtaposed concentric with the unitary member so that

2 the polarizable material is adjacent the transducer of the unitary member so as to cooperate therewith. The data storage device comprises the rotor of the apparatus whereas the transducer laminations comprise the stator thereof. When the rotor is moved relative to the stator the transducers and the polarizable material cooperate with each other to read from, or write data, into the storage apparatus.

In a specific embodiment of the invention, two flat annuli comprising a diamagnetic lamina and a ferromagnetic lamina are joined together to form one of the laminations. Each lamination includes a planar projection extending beyond a first rim thereof and each projection includes a through-hole or aperture formed therein. A magnetic transducer of general U-shape is formed on the projection of each ferromagnetic lamina with the arms of the transducer extending from the projection to the second rim of the lamina. The arms of the transducer are proportioned to leave a gap on the second rim of the lamina. The laminations are joined together with their apertures substantially aligned to form a hollow cylindrical unitary member. A cylindrical member having a coating of magnetizable material is positioned concentric with the unitary member so that the magnetizable material is adjacent the gaps of the transducers. The open ends of the unitary member are closed, as by end plates, The cylindrical member is proportioned to provide a bearing clearance with the rims of the laminations. Pressurized air is introduced into the bearing clearance to create a hydrostatic air bearing to air float the drum within the unitary member. A plurality of turbine bucket scoops are also formed in the surface of the cylindrical member so as to girdle the cylindrical member. Pressurized fluid is directed to impinge against the bucket scoops and rotate the cylindrical member frictionlessly with respect to the unitary member. Thus, high speed turbine drive of a rotor having data storage properties is provided with the rotor air floated and the stator functioning as a transducer.

A feature of the invention is the provision and offsetting of the apertured projections of the laminations. An electrical signal wire for each transducer is threaded through the apertured projection of the transducer. Therefore, the transducer lamina may be made much thinner than the signal wires because the projections and consequently the signal wires are beyond the cylindrical surface of the unitary member. Thus, a large number of information tracks may be recorded on the drum even though the drum is miniaturized. Offsetting the projections in a helical distribution around the surface of the unitary member avoids interference between the wires themselves. The apertured projection also permits matrix wiring of the transducers.

Accordingly, it is still a further object of this invention to provide data storage apparatus that permits miniaturization or reduction to a small size.

It is still a further object of this invention to provide a turbine drive, high speed, high capacity memory in which the transducer structure effectively comprises the stator of the turbine memory and the storage device comprises the rotor.

In the drawing:

FIGURE 1 is an isometric view of a laminated transducer utilized in practicing the invention; and FIGURE 2 is a partially broken, isometric view of data storage apparatus utilizing the invention.

Referring to FIGURE 1, a pair of lamina 10 and 12, each having a flat, ring-like shape, are aligned and joined together to form a lamination or laminated annulus 14. The lamina 12 is composed of a ferromagnetic material such as Mu metal, Permalloy, or ferrite which is placed or formed on a substrate lamina 10 made of a dimagnetic material, such as copper. The combined lamination 14 has a central aperture 15 and also a knob-like planar projection 16 extending beyond the outer rim 17 thereof. The projection 16 has an aperture 18 formed therein. A transducer 20 of general U-shape is magnetically coupled to the lamina 12. Preferably, though not necessarily, the transducer 20 is formed in the ferromagnetic lamina 12. In the latter case, the aperture 18 and the projection 16 define the body 22 of the magnetic transducer 20 whereas a pair of arms 24 and 26 of the transducer 20 are formed by removing portions of the ferromagnetic material on the lamina 12 to complete the generally horseshoe shape. The arms 24 and 26 extend from the projection 16 across the annulus 14 to the inner rim 27 thereof. The arms 24 and 26 are separated from each other at the inner rim 27 to form a magnetic gap 28. A plurality of openings 29 are made in the lamination 14 for receiving bolts for joining to other laminations 14. A conductive lead 30 is threaded through and looped around the aperture 18 of the laminated transducer 14. A back gap 31 may be formed in the diamagnetic lamina 10 at the top of aperture 18 and extending from the aperture 18 to the outer rim of the projection 16.

The lamination 14 may, for example, be manufactured by depositing, by electroplating or otherwise, a lamina of paramagnetic material such as a ferrite on a washer or flat annulus having a knob-like projection and made of a diamagnetic but conducting material such as copper. An aperture is formed in the projection (as by punching or etching) to provide the core of a transducer of the U-shaped type. The arms of the transducer are formed by removing material from the ferromagnetic lamina. This may be accomplished by photoetching techniques or other suitable techniques. A gap is formed between the arms of the transducer to cause magnetic flux bridging of the gap. A back gap is also formed at the top of the aperture in the diamagnetic lamina to prevent a shorted transformer effect due to incidental flux linkages. A plurality of openings or holes are then formed in the lamination 14. Thus, simple mass production techniques may be resorted to in constructing one embodiment of the invention. The use of very thin lamina facilitates creation of very narrow gaps by deposition or etching because the aspect ratio (gap width to gap depth) may thus be made less than $\frac{1}{10}$ while still yielding sufficiently narrow gaps for high density recording.

A memory 50 embodying the invention is illustrated in FIGURE 2. The memory 50 includes a plurality of the laminations 14 which are joined together, with their central apertures 15 in alignment but their projections 16 offset, to form a unitary member 52. The unitary member 52 therefore comprises a hollow cylindrical form. Periodically spaced throughout the unitary member 52 are a plurality of annular washers 54 each having radial passages or openings 56 extending around the circumference of the washers 54 from the inner rim to the outer rim thereof. The radial passages 56, as will be explained in more detail subsequently, comprise outlet drains for pressurized bearing fluid. An inlet port 58 on a spacer washer 59 is included in the unitary member 52 to channel pressurized fluid into the inner rim of the laminations 14 through a passage 61 extending radially from the outer rim of the washer 59 to the inner rim thereof.

The memory 50 also includes a cylindrical drum or member 62 which is inserted into the central apertures 15 of the joined laminations 14. The cylindrical member 62 also may be formed in the truncated conical shape with the stator members suitably matched to the changing shaft radius. The cylindrical member 62 is machined to exhibit a cylindrical shape slightly smaller than the hollow cylinder formed in the unitary member 52 to provide a bearing clearance between the cylindrical member 62 and the member 52. Such a bearing clearance together with the pressurized fluid provides a hydrostatic bearing for floating the member 62. The member 62 has a coating of magnetizable material 64 formed on the surface 63 thereof. The surface 63 may be heat treated to avoid being nicked. A plurality of bucket scoops or turbine blades 66 are formed in the surface 63 of the member 62 at one of its end positions. These turbine buckets 66 are formed in a circumferential ring girdling the member 62 so as to provide a turbine drive assembly for the memory 50. A washer member 70 having an inlet port 72 and an outlet drain 74 is placed in the unitary member 52 to align with the buckets 66. The inlet port 72 is disposed opposite the buckets 66 to direct pressurized fluid from a turbine nozzle onto the buckets 66.

A pair of end bells 76 and 78 are secured to either end of the unitary member 52 by bolts 80 inserted through the openings 29 in the laminations 14 as well as through corresponding openings in the spaced washers and the end bells themselves. The bolts 80 are secured by nuts, not shown. The end bells 76 and 78 seal the open ends of the unitary member 52. Outlet ports or openings 84 are made in the end bells 76 and 78.

The projections 16 of the laminations 14 extend beyond the outer surface of the unitary member 52. This permits the signal leads 30 to be inserted through the apertures 18 for ease of coupling to the transducers 20. The leads 30 may be wired to the transducers 20 in a matrix arrangement thereby permitting coincident current and/or inhibit current transducer selection if desired. The projections 16 are offset from one another and may, for example, be positioned to form a helical pattern around the outer surface of the unitary member 52, as shown.

The data storage apparatus 50 operates as a pressurized fluid driven turbine. The pressurized fluid may, for example, be air. The member 62 functions as the rotor of the turbine whereas the laminated transducers 14, joined together to form the unitary member 52, function as the stator of the turbine. The inner surface of the unitary member 52, i.e. the summation of the inner rims of the laminated transducers and the outer surface of the member 62 function as bearing surfaces to form a bearing clearance 86.

Pressurized air is introduced into the air bearing inlet ports 58 in the spacers 95 to flow into the bearing clearance 86. The pressurized air flows through the bearing clearance 86 and out of the outlet drain ports 56 in the spacer washers 54 as well as out of the outlet ports 84 in the end bells 76 and 78. The pressurized air creates a hydrostatic air bearing between the cylindrical member 62 and the unitary member 52 to air float the member 62. Pressurized air is also introduced into the port 72 which is shaped to function as a jet stream nozzle. The air impinges against the turbine blades 66 of the member 62. The pneumatic energy contained in the pressurized air causes the member 62 to rotate and the air is exhausted through out outlet port 74 after the pneumatic energy is converted into rotary motion energy. The member 62 rotates on a pressurized air cushion and therefore exhibits substantially frictionless rotation and also provides self-centering. Fast access time may be provided by making the diameter of the member 62 small. The inner diameter of the laminations 14 are also made correspondingly small. The air cushion centers the member 62 with the member 52 so as to provide an identical alignment therewith on each movement.

Even though the memory 50 may be miniaturized, a large amount of information data may be recorded on the member 62. Each information track in the member 62 need only be as wide as the ferromagnetic lamina 12 since this width defines the width of a transducer 20. The small width tracks are accurately aligned with the transducer 20 because of the air bearing construction and the close tolerances inherent in the construction of such devices as used in the invention. Each transducer 20 is shielded on either side thereof by the adjacent ferromagnetic laminas 12. Consequently, significant magnetic fringing from track-to-track is thereby prevented. The raised elevation of the projections 16 permit wires thicker than the transducer 20 to be utilized for coupling to the transducers 20 and the offsetting of the projections 16 prevents interference between wires. The conductive laminas 10 also electrically shield the wires.

Four typical dimensions of an exemplary memory of the described type are: a member 62 of 1 inch diameter and 3 inches long; a radial clearance between member 52 and the member 62 of 0.2 milli-inch, and an end clearance of 0.4 milli-inch; a copper substrate lamina 10 of 1.3 milli-inches thick; and a magnetic lamina 12 of 2 milli-inches thick. One track on the member 62 is therefore 2 milli-inches wide. The member 62 can be rotated at speeds at least as high as 120,000 r.p.m. and a linear recording density in excess of 1000 bits per inch is permissible. Three groups of 256 laminated tranducers provide a storage capacity in excess of $2.3 \times 10^6$ bits with 250 microseconds average access time.

It is apparent that a memory embodying the invention lends itself to alternate constructions. Several transducers may be formed on each lamination and equally spaced thereon. The rotor may be driven by an electric motor rather than a turbine. Furthermore, a portion of the stator itself may comprise the stator of an electric motor. Finally, in either a turbine type or an electric motor type drive the rotary speed may be made substantially constant by forming a closed loop feedback control to brake the rotation if the speed varies.

Thus, in accordance with the invention, a new and improved memory having a fast access time as well as large storage capacity is provided. The transducer assembly of the memory functions as the stator whereas the cylindrical member functions as the rotor. The memory may be miniaturized and mass produced by simple manufacturing techniques to provide low cost memories. No hand adjustments or alignments are required to make the transducers read reliably.

What is claimed is:

1. Data storage apparatus comprising in combination:
means providing a plurality of laminated annuli joined together to form a unitary member,
a plurality of tranducers formed on said annuli, and
a data storage device juxtaposed concentric with said unitary member so as to cooperate with said transducers.

2. A transducer assembly for a data storage device, comprising in combination:
a plurality of laminated annuli joined together to form a unitary member and juxtaposed concentric with said device, and
a plurality of transducers formed on said laminated annuli so as to cooperate with said device.

3. Data storage apparatus, comprising in combination:
a cylindrical data storage device,
a plurality of laminated transducers with each lamination formed in the shape of an annulus, and
means assembling said laminated transducers to be concentric with said device.

4. Data storage apparatus in accordance with claim 3 and further comprising:
means for moving said device and said transducers relative to each other.

5. Data storage apparatus, comprising in combination:
a data storage device having a plurality of turbine buckets, a plurality of laminated transducers with each lamination formed in the shape of an annulus,
means assembling said laminated transducers to be concentric with said device, and
means for applying pressurized fluid to said turbine buckets to rotate said device.

6. Data storage apparatus comprising in combination:
a plurality of laminated transducers with each lamination formed in the shape of an annulus having an aperture,
means for assembling said laminations with said apertures in substantial alignment to provide a unitary member having a central aperture,
a cylindrical member juxtaposed concentric with said unitary member to provide a bearing clearance therewith,
means for applying pressurized fluid into said bearing clearance to create a fluid bearing between said unitary member and said cylindrical member,
a plurality of turbine buckets formed in the surface of said cylindrical member, and
means for applying pressurized fluid to said turbine buckets to rotate said cylindrical member.

7. A data storage device comprising in combination:
a stator including a plurality of laminated annuli joined together to form a unitary member with each of said annuli having a transducer thereon, and
a rotor having a coating of polarizable material juxtaposed concentric with said stator so that said polarizable material is adjacent to said transducers.

8. Data storage apparatus, comprising in combination:
a data storage device having a coating of polarizable material for storing data by the polarization of discrete areas of said material,
a plurality of laminated annuli joined together and encircling said device, and
a transducer formed on each of said annuli adjacent to said polarizable material.

9. Data storage apparatus in accordance with claim 8 and further comprising:
means for moving said device and said annuli relative to each other.

10. A head assembly, comprising in combination:
a plurality of lamina each formed in the shape of an annulus having a central aperture and each composed of a diamagnetic lamina and a ferromagnetic lamina joined together in a unitary structure with said apertures in substantial alignment, and
means providing a substantially horseshoe shaped transducer head formed on each of said ferromagnetic lamina out of a portion of said ferromagnetic lamina and spaced apart from the remaining portion of said ferromagnetic lamina.

11. Data storage apparatus, comprising in combination:
a plurality of laminations each formed in the shape of an annulus having an aperture and first and second circumferential rims,
means providing a projection having an aperture on the first rim of each of said laminations,
each of said laminations including a diamagnetic lamina and a ferromagnetic lamina joined together to form said lamination,
a horseshoe shaped transducer formed out of a portion of said ferromagnetic lamina and spaced from the remaining portion of said ferromagnetic lamina, said transducer having a body lying along the projection on the first rim of said ferromagnetic lamina, a pair of arms extending from the first rim to the second rim thereof, and a gap lying along the second rim of said ferromagnetic lamina,
means for assemblying said plurality of laminations to form a unitary member with said apertures in substantial alignment but with said projections offset from each other, and means providing a magnetic cylindrical member juxtaposed concentric with said unitary members so as to be adjacent the gap in each of said transducers.

References Cited

UNITED STATES PATENTS

| | | | |
|---|---|---|---|
| 2,561,338 | 7/1951 | Camras | 179—100.2 |
| 3,029,416 | 4/1962 | Quade | 340—174.1 |

| | | | |
|---|---|---|---|
| 3,329,942 | 7/1967 | Levene et al. | 340—174.1 |
| 3,382,325 | 5/1968 | Camras | 340—174.1 |

BERNARD KONICK, Primary Examiner
W. F. WHITE, Assistant Examiner

U.S. Cl. X.R.

29—603; 179—100.2